May 1, 1945.   G. V. MORRIS ET AL   2,375,022
INSTRUMENT FOR TESTING GROUNDING RESISTANCE
Filed Nov. 11, 1941
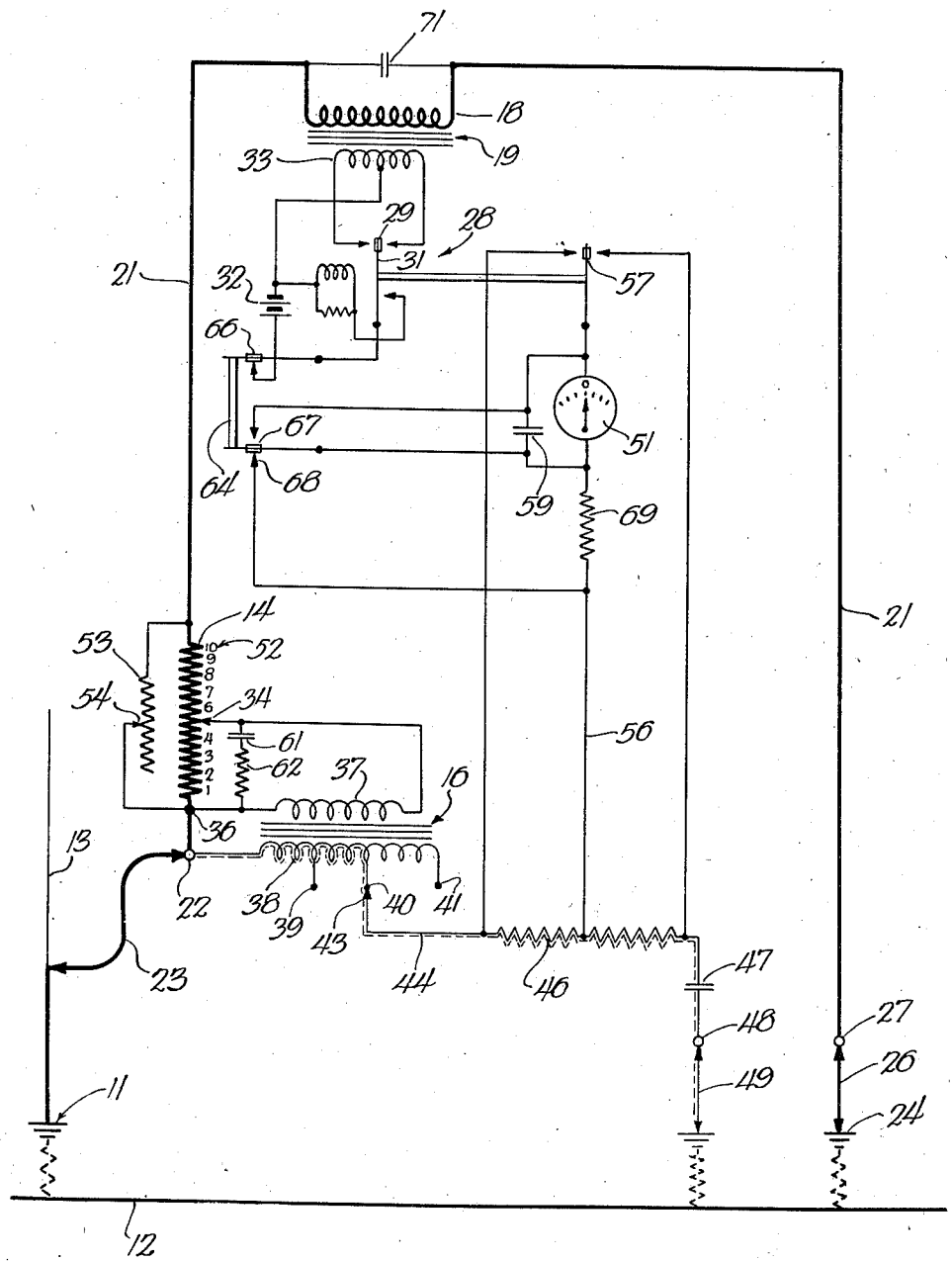
INVENTORS:
George V. Morris
Robert Adler
BY Mann, Brown
ATTYS Patented May 1, 1945

2,375,022

UNITED STATES PATENT OFFICE 2,375,022

INSTRUMENT FOR TESTING GROUNDING RESISTANCE

George V. Morris, Berkeley, and Robert Adler, Chicago, Ill., assignors to Associated Research, Incorporated, Chicago, Ill., a corporation of Illinois Application November 11, 1941, Serial No. 418,626

20 Claims. (Cl. 175—183)

Ground connections between apparatus or electrical circuits and the earth are very important. In some instances they form part of the circuit, whereas in other instances they do not normally carry appreciable current but serve merely as safety protections, for example to carry lightning charges to the ground, or to prevent the building up of a potential which will cause a static spark. It has become standard practice in a great many fields to specify a certain maximum ground resistance which is permissible. For example, in munitions plants, where static sparks would be very dangerous, the grounding resistance must be only a few ohms. The resistance of the ground, of course, depends upon the character of the soil, particularly its dampness and density, and on the proximity of the water table to the conductor used for grounding, as well as the area of the earth electrode in contact with the ground. The resistance of the earth electrode or grounding conductor is negligible.

Apparatus which has been known before for testing the grounding resistance have, for the most part, been either expensive to manufacture, or somewhat unsatisfactory in use, or both.

An object of the present invention is, therefore, to provide an instrument for testing grounding resistance, which may be manufactured economically, and which will be highly and dependably accurate under a wide variety of circumstances and which will be easily operated.

This is accomplished, in large part, by the use of a system in which the potential drop across the grounding resistance is balanced by the voltage from a transformer so connected that under conditions of balance, when the reading is taken, no current flows through the transformer secondary winding. This permits the use of a small transformer, with advantages both in cost reduction and in lightening weight for portability. It also makes the ratios of voltages of a tapped secondary entirely dependable and accurate, so that a single factory adjustment for calibration is all that is required for all of the secondary taps. Heretofore, separate calibration has been necessary for each position of the range-selecting switch. Furthermore, a phasing circuit is added in parallel with the primary, so that imperfections in rectification will have substantially no effect when the balanced condition has been reached. The apparatus is entirely satisfactory over a wide range in grounding resistances being tested, and in spite of wide variations in resistance of the supplemental grounds required for the test.

Additional objects and advantages of the invention will be apparent from the following description and from the drawing which is a diagrammatic showing of the invention.

A preferred form of the invention has been chosen for illustration and description, in compliance with section 4888 of the Revised Statutes, but persons skilled in the art will readily perceive other means for accomplishing the same results, and the claims are therefore to be construed as broadly as possible, consistent with the prior art.

The earth electrode to be tested is indicated by the usual ground indicating symbol 11. The purpose of the invention is to test its grounding resistance, i. e., the resistance between it and the earth water table where the resistance is substantially zero. In the drawing, the line 12 represents the water table. The ground electrode 11 is normally connected by a grounding conductor 13 to the equipment or circuit which is to be grounded. In some instances it may be left connected during the test and in other instances it should be left disconnected.

According to the present invention, the grounding resistance is measured by passing an alternating current through it, thus producing a potential drop across it and, in effect, determining the potential necessary to exactly balance out this potential drop. In the preferred form of the invention, however, the measurement might be stated more simply as comparing the grounding resistance with a known resistance, the known resistance in this instance being a potentiometer 14. A comparison is made by sending the same current through both resistances and determining what proportion of the potentiometer 14 is necessary to produce through transformer 16 a voltage which exactly balances out the potential drop across the grounding resistance.

Source of test current

The current which is passed through both the potentiometer 14 and the ground 11, 12 is induced in secondary coil 18 of a power transformer 19. This current follows the circuit shown in heavy lines 21, thus passing from coil 18 through potentiometer 14 to terminal or binding post 22 provided on the apparatus, from which it may be connected by a lead 23 to the earth electrode 11, from which it flows through the ground 12 to an earth electrode 24 which is used for test purposes only, the earth electrode 24 being connected with a lead 26 to terminal or binding post 27 on the instrument which is connected directly to secondary coil 18.

Current is induced in the secondary coil 18 by a conventional vibrator type of source of alternating power, represented generally by 28. Briefly stated, the contact 29 carried by vibrating armature or reed 31 connects battery 32 first to one half of primary coil 33 and then to the other half, with the connections such as to reverse the flux so that an alternating flux is produced in the core which induces the alternating voltage in secondary coil 18.

Balancing voltage

The current flowing through potentiometer resistance 14 creates a voltage drop thereacross and a proportional voltage drop between the sliding contact 34 and the terminal 36, between which is connected the primary coil 37 of potential transformer 16. The secondary coil 38 of this transformer is preferably provided with three taps 39, 40 and 41, the number of turns connected by these taps preferably varying in multiples of ten. The secondary coil 38 or part thereof is connected by a range-selecting switch 43 into a balancing shunt circuit 44 indicated by serrated lines, this circuit including resistance 46, condenser 47, instrument terminal or binding post 48, and a lead wire 49 which is temporarily grounded for test purposes. The connections of the primary 37 and secondary 38 are such that the voltage induced in secondary 38 bucks or opposes the potential drop of the grounding resistance at 11 or, in other words, opposes (within the balancing shunt circuit) the potential between terminal 22 and ground. The value of this bucking potential may be varied in ratios of 1 to 10 by shifting the range-selecting switch 43 between the taps 39, 40 and 41, and after the proper range has been selected for a given test, the bucking potential may be adjusted by sliding the potentiometer contact 34 to exactly balance the potential drop between terminal 22 and ground. When this exact balance has been obtained, a galvanometer 51 will indicate that current has ceased to flow in the balancing shunt circuit, and the grounding resistance at 11 can be determined by the position of the sliding contact 34 adjacent a scale 52.

Uniform accuracy

Inasmuch as the reading on the scale 52 is taken when no current is flowing in the balancing shunt circuit 44, it follows that the resistance of the grounding connection at 49 has no effect. Of course, if this resistance is extremely high, the galvanometer 51 will seem not to be very sensitive and it will not be possible to locate the balancing point of sliding contact 34 as exactly as if the grounding resistance at 49 were lower. However, it is easy to get a fairly low contact resistance temporarily, and, since constancy of the resistance is unnecessary, this presents no problem.

It will be observed that the secondary coil 38 is included in no circuit other than the balancing shunt circuit 44. Accordingly, when the condition of balance has been obtained, there will be no current flowing through the coil 38. This being so, the transformer 16 may be a very light, small transformer. The absence of current in the secondary also means that the ratio will run true: If tap 40 represents ten times as many turns as tap 39, the potential at 40 will be quite accurately ten times that at 39.

Single calibrating adjustment

Because the potentials at 40 and 41 are exactly ten times that at 39 and 40, respectively, when the balance condition has been reached, a single calibrating adjustment will suffice for all three taps. If the scale 52 is arranged to read in ohms resistance of the ground connection at 11 when range selector 43 is on tap 39, this figure may be multiplied by 10 if tap 40 is used and by 100 if tap 41 is used. With proper design the instrument may be calibrated very easily to produce this direct reading of the scale 52 by providing an adjustment resistance 53 across the potentiometer 14. The contact 54 of this adjustment resistance will, of course, be set at the factory under known conditions to make the reading of scale 52 accurate.

Rectifier

In order for the galvanometer 51 to indicate the amount of current flow in the balancing shunt circuit 44 or to indicate the absence of current therefrom, it is necessary for the current through the galvanometer to be rectified, the current in the balancing shunt circuit 44 being alternating, while the preferred type galvanometer responds only to direct current. According to the present invention, a very simple form of rectification is provided. One terminal of the galvanometer is connected through wire 56 through the center of resistance 46, the ends of which are alternately connected by contact 57 with the other terminal of the galvanometer. The contact 57 vibrates in synchronism with the contact 29, being mechanically linked thereto, so that one pulse of the alternating current generated in 18 is sent through the galvanometer in one direction; and the next pulse, although reversed in 18, is in effect again reversed by contact 57 so that it is sent through the galvanometer 51 in the same direction as the preceding impulse. Thus, with a given unbalanced setting of the sliding contact 34, all the current flowing through the galvanometer 51 will flow in one direction. The direction that this current will flow is dependent on whether the potential across 34 to 36 is higher or lower than that across 11—12. The galvanometer 51 is preferably a zero-center type of galvanometer, so the direction in which the needle is deflected from the center-zero position will indicate which way the sliding contact 34 must be moved in order to obtain the balance condition. The operator will then merely move the contact 34 in the indicated direction until the needle of the galvanometer comes to rest at the zero position.

The condenser 47 prevents any stray direct currents from passing through the galvanometer to give a false indication. A condenser 59 connected across the galvanometer will by-pass some of the stray alternating currents around the galvanometer. However, freedom from interference with alternating currents is obtained mainly by selecting a frequency for the vibrator 31 which is not the same as or a simple multiple or division of any stray alternating current likely to be encountered. Hence, if a stray alternating current is encountered, its alternations will not occur in synchronism with the movements of the contact 57 and hence each alteration will ordinarily be divided so that part goes through the galvanometer in one direction and part in the other, and hence they will tend to cancel out. If the two frequencies are quite close together, there may be a beat effect which will tend to make the needle of the galvanometer move slightly from side to side, but even this will not cause serious trouble since the oscillation of the needle can still be centered about the zero position. For general purposes, a frequency of 95 to 98 for the vibrator 31 is preferred, since frequencies encountered in the grounded equipment are almost never between 90 and 100, and multiples of frequencies in the 95 to 98 range do not seem to coincide with any higher frequencies encountered.

Primary compensation

The flow of current through the primary coil 37 does not ordinarily have the same wave shape as the flow of current through the potentiometer 14, and it is not in phase with it. This current through the primary coil 37 constitutes a diversion of current from the portion of the potentiometer across which it is connected, and, accordingly, tends to irregularly alter the voltage across this utilized portion of potentiometer 14. The induced voltage in the secondary 39 will therefore be correspondingly altered and therefore will not be of exactly the same wave shape as the potential drop between terminal 22 and ground. We have determined that this sometimes causes slight errors or slight inexactness of readings by virtue of the fact that if the timing of the contact 57 is not perfect, these different wave shapes will not cancel out. According to the present invention, these possible errors or inexactitudes are substantially eliminated by providing compensation for the current through primary coil 37. This compensation comprises a condenser 61 in series with a resistance 62, together connected across the coil 37. The wave form of current flowing through this compensating shunt is very nearly the compliment of that flowing through the primary 37, so that the two cooperate with one another to leave the wave shape and phase of the voltage between the contact 34 and the terminal 36 approximately that which it would be if neither the coil 37 nor the condenser 61 were present.

Control switch

The apparatus is turned on and off by a manual switch lever or push button 64. This lever controls a contact 66 to open the battery circuit when the device is not in use. It is shown in the closed position it assumes during a test. Lever 64 also controls a contact 67 which during the period of disuse shunts out the condenser 59 so as to connect the galvanometer coil in a closed circuit, thus dampening the movement of the galvanometer needle and armature during transit and preventing injury thereto. As the lever 64 is operated from the "off" position, the contact 66 closes shortly after contact 67 opens this shunt circuit. Before the contact 67 closes on contact 68, the galvanometer 51 is connected in series with a resistance 69. If the correct one of the taps 39, 40 and 41 has been chosen for the particular test, the movement of the galvanometer needle will be quite moderate, and the operator will continue to push the contact 67 down to the contact 68 and make his test, sliding the contact 34 to a position at which the galvanometer needle returns to zero. If, however, in the intermediate position of contact 67 the galvanometer needle jumps to say ¾ of the way to the end of the scale, the operator will know that he has selected the wrong tap for the range-selector switch 43, and he will shift it to a tap yielding lower or higher potential depending on the direction in which the galvanometer needle moved. This tends to avoid injury to the galvanometer.

Although any of the elements used in the illustrated circuit may of course have a wide variety of values, the following values have been found satisfactory and may help anyone select values for a similar circuit even though he may choose different values: battery, two No. 6 dry cells; power transformer 19, 40 turns in each half of the primary, 3250 turns in the secondary, with a core ¾ inch by ¾ inch in cross section; buffer condenser 71, .01 mfd.; potentiometer, 1400 ohms; potential transformer 16, ⅝ inch by ½ inch core with 2500 turns on the primary and 2900 turns on the secondary, tapped also at 290 turns and at 29 turns; resistance 46, 2000 ohms on each side of the center tap; condenser 47, 2 mfd.; galvanometer, 2000 ohms; resistance 69, 100,000 ohms; condenser 59, 25 mfd. The values of condenser 61 and resistance 62 should be chosen to match the characteristics of the particular transformer and circuit with which they are used, but in equipment which has been manufactured values of .1 mfd. and 15,000 ohms, respectively, have been found to give very good results. In determining these last two values under varying conditions, the following formulas may be helpful:

$$R = \frac{L}{T} \text{ and } C = \frac{4T^2}{L}$$

Where R is the resistance in ohms, L is the inductance of the primary in henrys, T is the time in seconds during which the vibrator contacts are closed for one pulsation of current, and C is the capacitance in farads.

Instead of the potentiometer 14, some other means for varying the relative responsiveness of the primary coil to the current in the main circuit could be used. Such means might comprise any type of variable transformer, either that known as an induction regulator, or one embodying multiple taps or a sliding contact. Such a transformer could be used with its secondary connected to primary 37 or it could be used in place of transformer 16. In either case its primary could be connected across a resistance in place of potentiometer 14.

A dynamometer type of galvanometer could be used in place of the direct-current galvanometer 51. In this event its field coil should preferably be connected in series in the circuit shown in heavy lines, and no rectifying contacts would be used.

From the foregoing it is seen that a resistance testing instrument suitable for testing grounding resistances has been devised which is relatively economical to manufacture both from the standpoint of cost of materials and from the standpoint of ease of calibration, and which is nevertheless highly dependable, accurate and convenient in use.

We claim:

1. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, carrying substantially no current except in said balancing shunt circuit, and provided with a plurality of taps through any one of which it may be connected in said balancing shunt circuit, a galvanometer connected in said balancing shunt circuit to indicate when the potentiometer adjustment stops the flow of current in the balancing shunt circuit by balancing voltage of the secondary coil against the potential drop across the grounding resistance, rectifying contacts to make the galvanometer responsive in one direction to an excess of the potential drop and in another direction to an excess of secondary voltage, and a condenser and resistance connected in series across the primary coil to compensate for the disturbing effects of its magnetizing current to substantially eliminate out-of-phase currents in the balancing shunt circuit when the opposing potentials are balanced.

2. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, carrying substantially no current except in said balancing shunt circuit, and provided with a plurality of taps through any one of which it may be connected in said balancing shunt circuit, a galvanometer connected in said balancing shunt circuit to indicate when the potentiometer adjustment stops the flow of current in the balancing shunt circuit by balancing voltage of the secondary coil against the potential drop across the grounding resistance, rectifying contacts to make the galvanometer responsive in one direction to an excess of the potential drop and in another direction to an excess of secondary voltage, a condenser and resistance connected in series across the primary coil to compensate for the disturbing effects of its magnetizing current to substantially eliminate out-of-phase currents in the balancing shunt circuit when the opposing potentials are balanced, a scale for indicating the portion of the potentiometer shunted by the primary coil of the potential transformer, and a single calibrating adjustment means associated with the potentiometer.

3. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, and carrying substantially no current except in said balancing shunt circuit, a galvanometer connected in said balancing shunt circuit to indicate when the potentiometer adjustment stops the flow of current in the balancing shunt circuit by balancing voltage of the secondary coil against the potential drop across the grounding resistance, rectifying contacts to make the galvanometer responsive in one direction to an excess of the potential drop and in another direction to an excess of secondary voltage, and a condenser and resistance connected in series across the primary coil to compensate for the disturbing effects of its magnetizing current to substantially eliminate out-of-phase currents in the balancing shunt circuit when the opposing potentials are balanced.

4. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, carrying substantially no current except in said balancing shunt circuit, and provided with a plurality of taps through any one of which it may be connected in said balancing shunt circuit, a galvanometer connected in said balancing shunt circuit to indicate when the potentiometer adjustment stops the flow of current in the balancing shunt circuit by balancing voltage of the secondary coil against the potential drop across the grounding resistance, rectifying contacts to make the galvanometer responsive in one direction to an excess of the potential drop and in another direction to an excess of secondary voltage, a scale for indicating the portion of the potentiometer shunted by the primary coil of the potential transformer, and a single calibrating adjustment means associated with the potentiometer.

5. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, and carrying substantially no current except in said balancing shunt circuit, a galvanometer connected in said balancing shunt circuit to indicate when the potentiometer adjustment stops the flow of current in the balancing shunt circuit by balancing voltage of the secondary coil against the potential drop across the grounding resistance, and rectifying contacts to make the galvanometer responsive in one direction to an excess of the potential drop and in another direction to an excess of secondary voltage.

6. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, and carrying substantially no current except in said balancing shunt circuit, means for indicating when the potentiometer-primary adjustment stops the flow of current in the balancing shunt circuit by balancing voltage of the secondary coil against the potential drop across the grounding resistance, and a condenser and resistance connected in series across the primary coil to compensate for the disturbing effects of its magnetizing current to substantially eliminate out-of-phase currents in the balancing shunt circuit when the opposing potentials are balanced.

7. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, carrying substantially no current except in said balancing shunt circuit, and provided with a plurality of taps through any one of which it may be connected in said balancing shunt circuit, means for indicating when the potentiometer-primary adjustment stops the flow of current in the balancing shunt circuit by balancing voltage of the secondary coil against the potential drop across the grounding resistance, and a condenser and resistance connected in series across the primary coil to compensate for the disturbing effects of its magnetizing current to substantially eliminate out-of-phase currents in the balancing shunt circuit when the opposing potentials are balanced.

8. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, carrying substantially no current except in said balancing shunt circuit, and provided with a plurality of taps through any one of which it may be connected in said balancing shunt circuit, means for indicating when the potentiometer-primary adjustment stops the flow of current in the balancing shunt circuit by balancing voltage of the secondary coil against the potential drop across the grounding resistance, a condenser and resistance connected in series across the primary coil to compensate for the disturbing effects of its magnetizing current to substantially eliminate out-of-phase currents in the balancing shunt circuit when the opposing potentials are balanced, a scale for indicating the portion of the potentiometer shunted by the primary coil of the potential transformer, and a single calibrating adjustment means associated with the potentiometer.

9. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, and carrying substantially no current except in said balancing shunt circuit, and means for indicating when the potentiometer-primary adjustment stops the flow of current in the balancing shunt circuit by balancing voltage of the secondary coil against the potential drop across the grounding resistance.

10. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, carrying substantially no current except in said balancing shunt circuit, and provided with a plurality of taps through any one of which it may be connected in said balancing shunt circuit, and means for indicating when the potentiometer-primary adjustment stops the flow of current in the balancing shunt circuit by balancing voltage of the secondary coil against the potential drop across the grounding resistance.

11. Apparatus for testing grounding resistances, including a circuit including a potentiometer and a source of alternating current for passing a current through the potentiometer and ground in series, a transformer having a primary coil connected adjustably across the potentiometer and a secondary coil connected in a balancing shunt circuit across the grounding resistance with a voltage phase opposed to that across the grounding resistance, carrying substantially no current except in said balancing shunt circuit, and provided with a plurality of taps through any one of which it may be connected in said balancing shunt circuit, means for indicating when the potentiometer-primary adjustment stops the flow of current in the balancing shunt circuit by balancing voltage of the secondary coil against the potential drop across the grounding resistance, a scale for indicating the portion of the potentiometer shunted by the primary coil of the potential transformer, and a single calibrating adjustment means associated with the potentiometer.

12. Apparatus for testing grounding resistances, including a main circuit including a source of alternating current for passing a current through the grounding resistance; a transformer having a primary coil responsive to said current and a secondary coil connected in a balancing shunt circuit which is parallel with the grounding resistance with a voltage phase opposed to that across the grounding resistance, and so connected that the current therein will be approximately zero when the voltage across said secondary coil balances the potential drop across said resistance, adjustable means for varying the relative responsiveness of the primary coil to the current in the main circuit, and means for indicating when the adjustable means stops the flow of current in the secondary coil by balancing the potential drop across the grounding resistance.

13. Apparatus for testing grounding resistances, including a main circuit including a source of alternating current for passing a current through the grounding resistance; a transformer having a primary coil responsive to said current and a secondary coil connected in a balancing shunt circuit across the grounding resistance with a voltage phase opposed to that across the grounding resistance, carrying substantially no current except in said balancing shunt circuit, and provided with a plurality of taps through any one of which may be connected in said balancing shunt circuit, adjustable means for varying the relative responsiveness of the primary coil to the current in the main circuit, means for indicating when the adjustable means stops the flow of current in the balancing shunt circuit by balancing the potential drop across the grounding resistance, a scale for indicating the relative responsiveness of the primary coil, and calibrating adjustment means for rendering the scale accurate.

14. Apparatus for testing grounding resistances, including a circuit including a resistance and a source of alternating current for passing a current through the resistance and ground in series, a transformer having a primary coil connected across the resistance and a secondary coil connected in a balancing shunt circuit across the grounding resistance with a voltage phase opposed to that across the grounding resistance, means to adjust the relative opposing strength of opposing voltage, a galvanometer connected in said balancing shunt circuit to indicate when the adjustment stops the flow of current in the balancing shunt circuit by balancing voltage of the secondary coil against the potential drop across the grounding resistance, rectifying contacts to make the galvanometer responsive in one direction to an excess of the potential drop and in another direction to an excess of secondary voltage, and a condenser and resistance connected in series across the primary coil to compensate for the disturbing effects of its magnetizing current to substantially eliminate out-of-phase currents in the balancing shunt circuit when the opposing potentials are balanced.

15. Apparatus for measuring resistance, including a battery, a vibrator operated thereby, a power transformer including a primary coil connected to the battery in reversing polarity by the vibrator and a secondary coil, a circuit, including a potentiometer, for connecting the secondary coil across the resistance to be measured, a potential transformer having a primary coil adjustably connected across the potentiometer and a secondary coil, a balancing shunt circuit for connecting the secondary coil across the resistance to be responsive to a potential drop across the resistance accompanying the flow of current therethrough from the secondary coil of the power transformer, said potential transformer secondary coil being connected in a direction so that the potential induced therein by the associated primary coil will oppose said potential drop, having a plurality of taps and carrying substantially no current except in said balancing shunt circuit, a galvanometer connected in said balancing shunt circuit, rectifying contact means synchronized with the vibrator for making the galvanometer selectively responsive to an excess of the potential drop over the opposing potential, a capacitance connected across the primary of the potential transformer to compensate for the disturbing effects of its magnetizing current, a scale for indicating the portion of the potentiometer shunted by the primary coil of the potential transformer, and a single calibrating adjustment means associated with the potentiometer.

16. Apparatus for measuring resistance, including a battery, a vibrator operated thereby, a power transformer including a primary coil connected to the battery in reversing polarity by the vibrator and a secondary coil, a circuit, including a potentiometer, for connecting the secondary coil across the resistance to be measured, a potential transformer having a primary coil adjustably connected across the potentiometer and a secondary coil, a balancing shunt circuit for connecting the secondary coil across the resistance to be responsive to a potential drop across the resistance accompanying the flow of current therethrough from the secondary coil of the power transformer, said potential transformer secondary coil being connected in a direction so that the potential induced therein by the associated primary coil will oppose said potential drop, having a plurality of taps and carrying substantially no current except in said balancing shunt circuit, a galvanometer connected in said balancing shunt circuit, rectifying contact means synchronized with the vibrator for making the galvanometer selectively responsive to an excess of the potential drop over the opposing potential, a scale for indicating the portion of the potentiometer shunted by the primary coil of the potential transformer, and a single calibrating adjustment means associated with the potentiometer.

17. Apparatus for measuring resistance, including a battery, a vibrator operated thereby, a power transformer including a primary coil connected to the battery in reversing polarity by the vibrator and a secondary coil, a circuit, including a potentiometer, for connecting the secondary coil across the resistance to be measured, a potential transformer having a primary coil adjustably connected across the potentiometer and a secondary coil, a balancing shunt circuit for connecting the secondary coil across the resistance to be responsive to a potential drop across the resistance accompanying the flow of current therethrough from the secondary coil of the power transformer, said potential transformer secondary coil being connected in a direction so that the potential induced therein by the associated primary coil will oppose said potential drop, and carrying substantially no current except in said balancing shunt circuit, means for indicating the flow of current in the balancing shunt circuit, and a scale for indicating the portion of the potentiometer shunted by the primary coil of the potential transformer.

18. Apparatus for measuring resistance, including a battery, a vibrator operated thereby, a power transformer including a primary coil connected to the battery in reversing polarity by the vibrator and a secondary coil, a circuit, including a potentiometer, for connecting the secondary coil across the resistance to be measured, a potential transformer having a primary coil adjustably connected across the potentiometer and a secondary coil, a balancing shunt circuit for connecting the secondary coil across the resistance to be responsive to a potential drop across the resistance accompanying the flow of current therethrough from the secondary coil of the power transformer, said potential transformer secondary coil being connected in a direction so that the potential induced therein by the associated primary coil will oppose said potential drop, having a plurality of taps and carrying substantially no current except in said balancing shunt circuit, a galvanometer connected in said balancing shunt circuit, a center tapped resistance in the balancing shunt circuit, rectifying contact means synchronized with the vibrator for connecting the galvanometer alternately across either side of the resistance, with opposite polarities, to make the galvanometer selectively responsive to an excess of the potential drop over the opposing potential, a capacitance connected across the primary of the potential transformer to compensate for the disturbing effects of its magnetizing current, a scale for indicating the portion of the potentiometer shunted by the primary coil of the potential transformer, and a single calibrating adjustment means associated with the potentiometer.

19. Apparatus for measuring resistances, including a main circuit including a source of alternating current for passing a current through the resistance to be measured; a transformer having a primary coil responsive to said current and a secondary coil connected in a balancing shunt circuit which is parallel with the resistance to be measured with a voltage phase opposed to that across the resistance, and so connected that the current therein will be approximately zero when the voltage across said secondary coil balances the potential drop across said resistance, adjustable means for varying the relative responsiveness of the primary coil to the current in the main circuit, and means for indicating when the adjustable means stops the flow of current in the secondary coil by balancing the potential drop across the resistance.

20. Apparatus for measuring resistances, including a main circuit including a source of alternating current for passing a current through the resistance to be measured; a transformer having a primary coil responsive to said current and a secondary coil connected in a balancing shunt circuit which is parallel with the resistance to be measured with a voltage phase opposed to that across the resistance, and so connected that the current therein will be approximately zero when the voltage across said secondary coil balances the potential drop across said resistance, adjustable means for varying the relative responsiveness of the primary coil to the current in the main circuit, means for indicating when the adjustable means stops the flow of current in the secondary coil by balancing the potential drop across the resistance, a scale for indicating the relative responsiveness of the primary coil, and calibrating adjustment means for rendering the scale accurate.

GEORGE V. MORRIS.
ROBERT ADLER.